Nov. 20, 1934.   P. G. STIMSON   1,981,205
STOCK CONTROL REGISTER
Filed Oct. 26, 1932   5 Sheets-Sheet 5

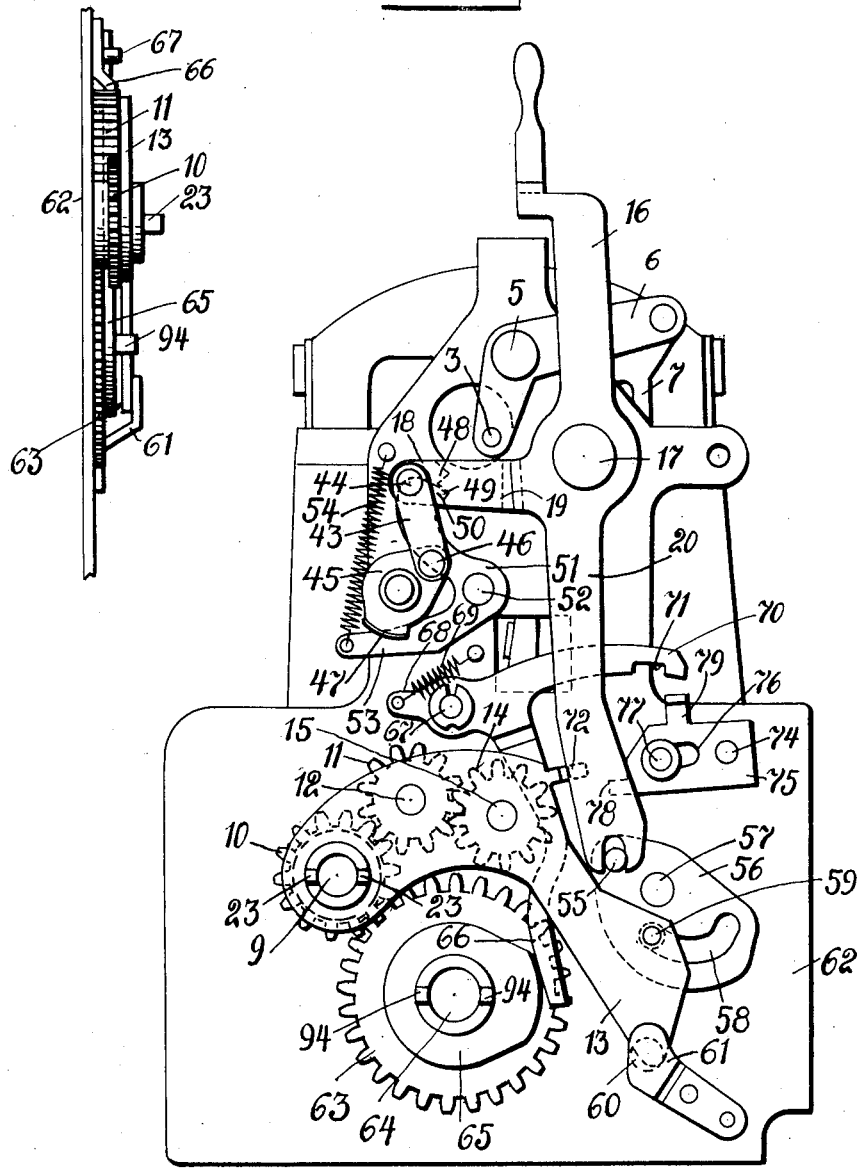

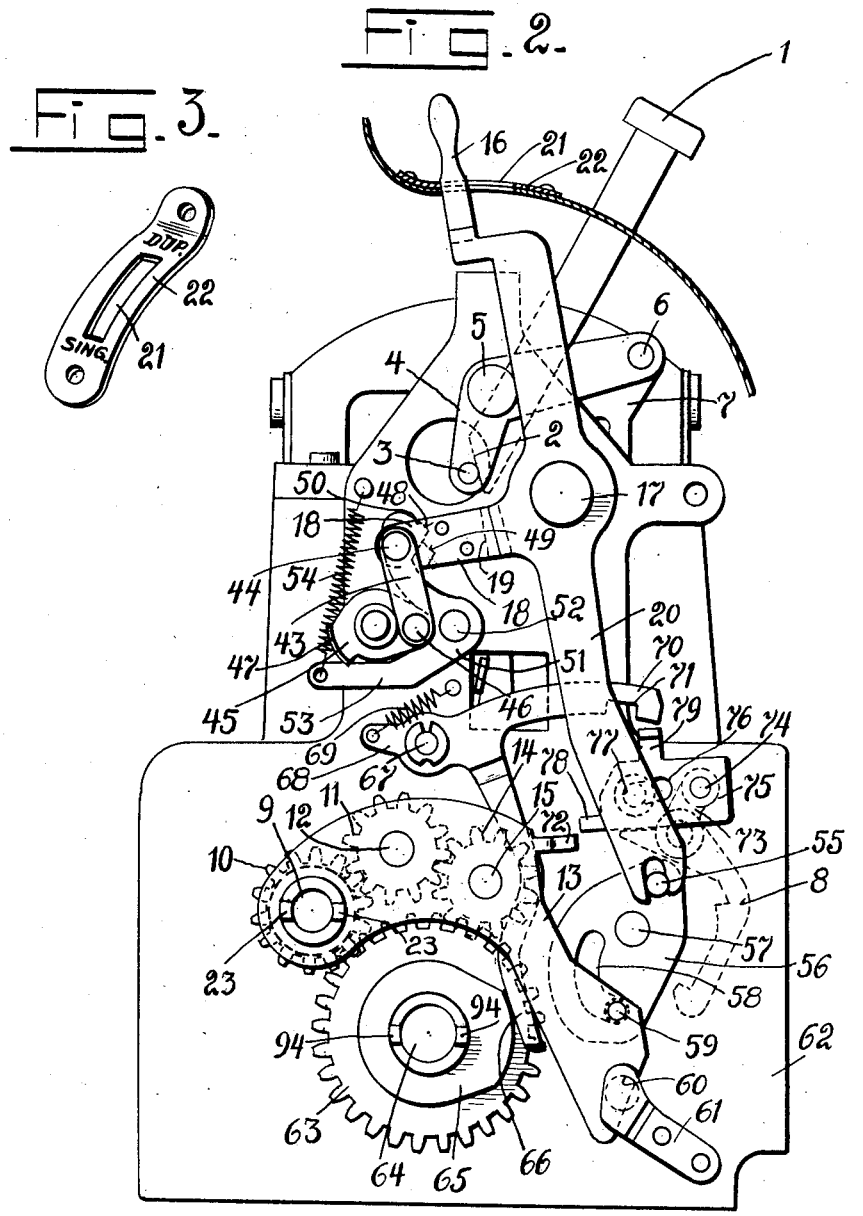

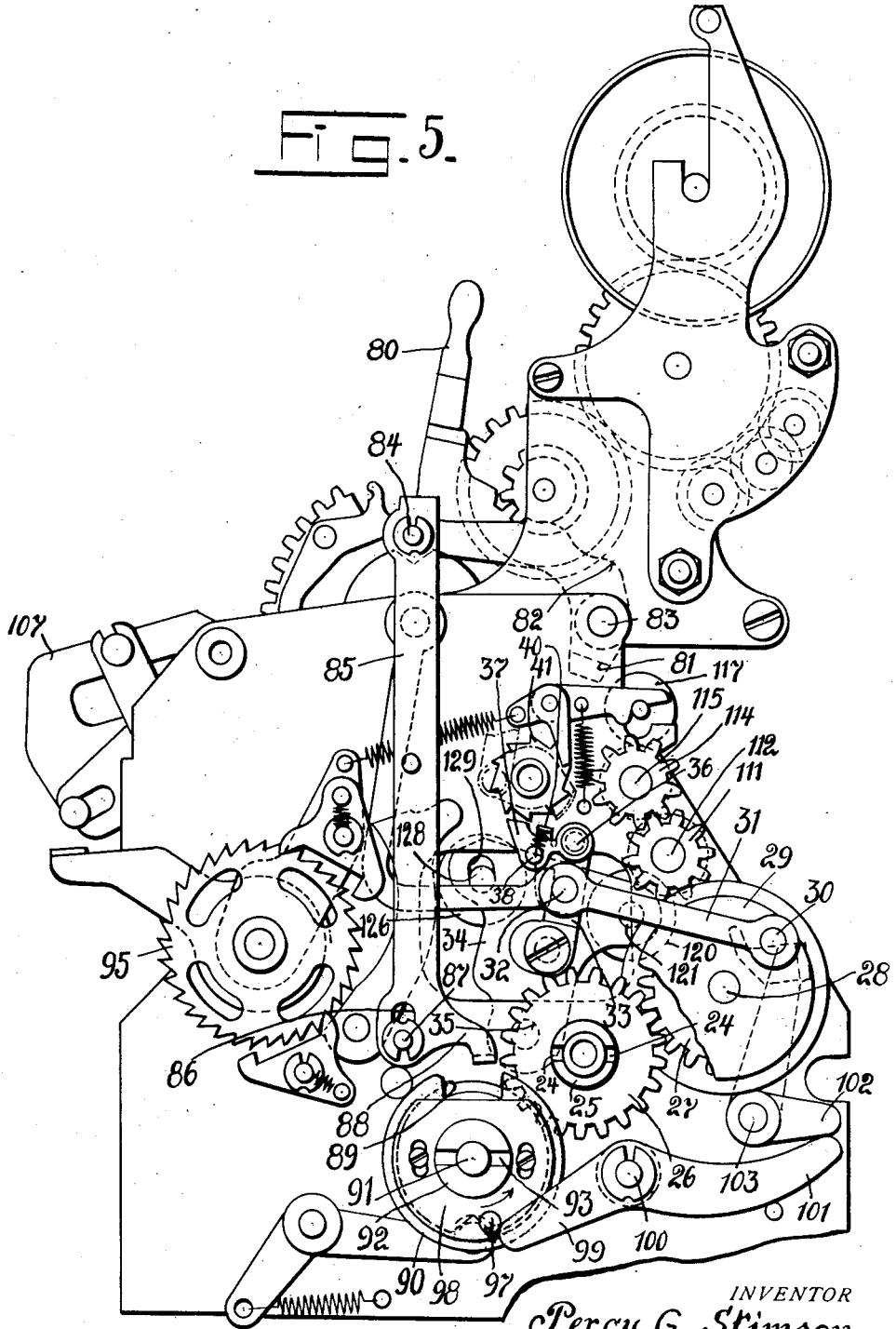

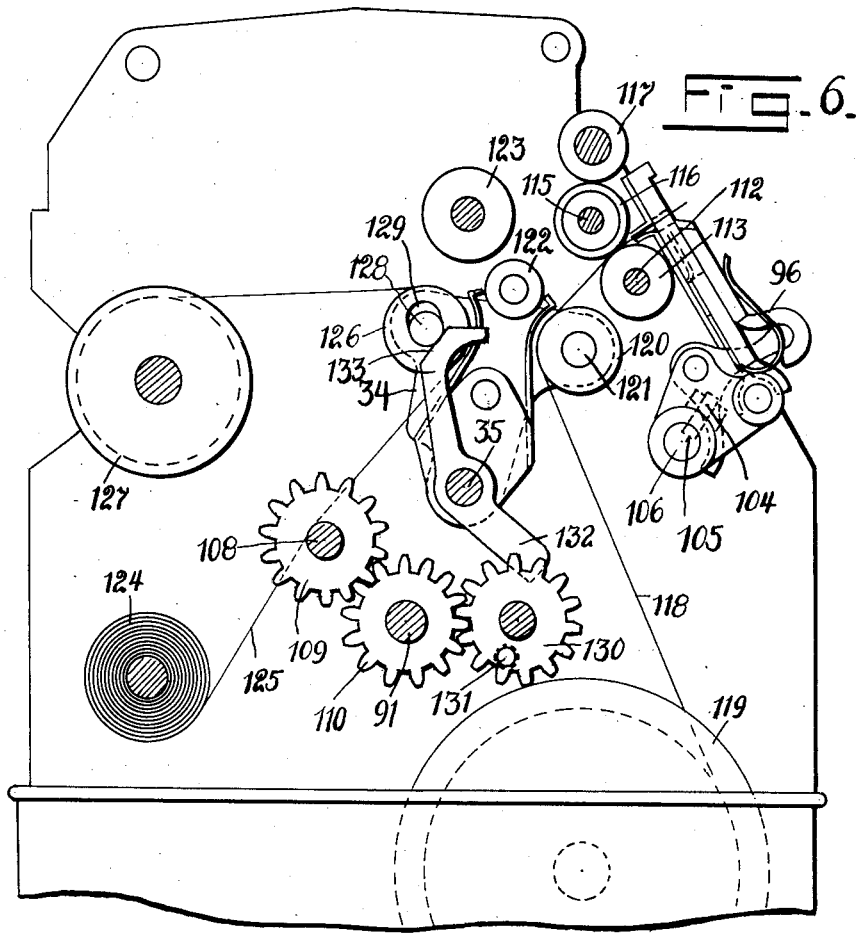

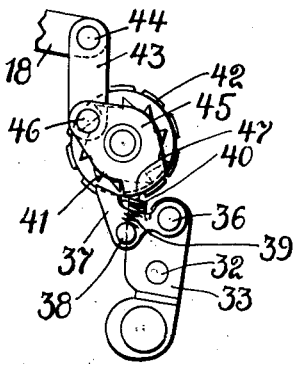

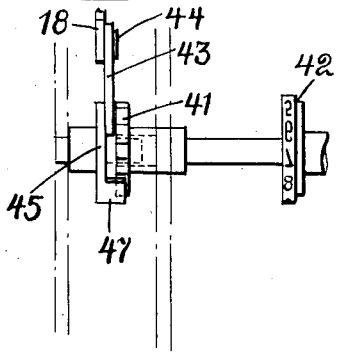

Fig. 9.

| NOT RETURNABLE OR EXCHANGEABLE UNLESS RETURNED WITHIN 5 DAYS | JOHN DOE J. MERCHANT CHICAGO | |
|---|---|---|
| Mfrs No. / CLASS NO. / STYLE | PRICE | SIZE | NO |
| 57A425  09 A1  021 | 105.55  50  1870 | 118 |

Fig. 10.

| NOT RETURNABLE OR EXCHANGEABLE UNLESS RETURNED WITHIN 5 DAYS | JOHN DOE J. MERCHANT CHICAGO |
|---|---|
| Mfrs No. CLASS NO. STYLE | PRICE  SIZE  NO |
| 57A425  09 A1  021 | 105.55  50  1870 |
| NOT RETURNABLE OR EXCHANGEABLE UNLESS RETURNED WITHIN 5 DAYS | JOHN DOE J. MERCHANT CHICAGO |
| Mfrs No. CLASS NO. STYLE | PRICE  SIZE  NO |
| 57A425  09 A1  021 | 105.55  50  1870 |

INVENTOR
Percy G. Stimson
BY Hastings W. Baker
ATTORNEY

Patented Nov. 20, 1934

1,981,205

UNITED STATES PATENT OFFICE 1,981,205

STOCK CONTROL REGISTER

Percy G. Stimson, Dayton, Ohio, assignor, by mesne assignments, to Central United National Bank, Cleveland, Ohio, as trustee Application October 26, 1932, Serial No. 639,677

9 Claims. (Cl. 101—66)

This invention is an improvement on the type of register shown in the patent to A. S. Wheelbarger et al., No. 1,858,813, issued May 17, 1932, and relates in particular to a mechanism by which one or more tickets or tags may be issued, on each of which is printed by means of an electroplate certain data, such as directions, name of the merchant, etc., and on which is printed certain other data of a variable nature.

A lady's suit generally consists of three pieces, though this number is not fixed and it may consist of a lesser or greater number. Obviously, in a retail store there may be a number of different suits of much the same color and yet having different prices or having different sizes. One of the great difficulties experienced by the retail merchant is to keep all the articles of a given suit together so that after a lady has tried on one article and has decided not to purchase it, that article will be correctly matched with its companion articles to make one complete suit. The object of this invention is to provide a machine whereby a single tag will be issued for all of the articles composing a suit and a double tag will be issued for one of the articles. For instance, this double tag may be attached to the coat and the single tag will be attached to each of the other articles composing the suit. On each of these tags, whether it is a single tag or a double tag, the department number is imprinted, together with the season during which the article was placed on sale, the month, and the day thereof, the manufacturer's number, its class, the number of pieces composing the suit, the style, the sales price, the size, and the consecutive number. The same consecutive number would, therefore, appear on all the articles comprising the suit.

While I have described this as applying to ladies' garments, it is obvious that it might be applied to men's garments and for other uses.

Other objects and advantages will appear in the detailed specification and claims which follow.

In the drawings:

Fig. 1 is an elevational view of the motor frame of the register showing the position of the parts in the position in which they would be placed in order to issue a single tag.

Fig. 2 is a similar view but showing the parts in the position in which they would be placed in order to issue a double tag.

Fig. 3 is a perspective view of the index plate.

Fig. 4 is an end view of the parts shown in the lower portion of Fig. 1.

Fig. 5 is an elevational view of the register frame facing the mechanism shown in Fig. 1.

Fig. 6 is an elevational view, partly in cross section, through the register of the type shown in the said patent.

Fig. 7 is a detailed view of a portion of the consecutive number throw-out mechanism.

Fig. 8 is a side elevational view of the mechanism shown in Fig. 7.

Fig. 9 is a plan view of a single tag, and

Fig. 10 is a similar view of a duplicate tag.

As shown in the patent to A. S. Wheelbarger 1,851,267, patented March 29, 1932, a motor drive is provided which drives the main drive shaft one complete revolution for each operation of the machine. A push bar 1 is provided which is guided by any suitable means provided with a cam 2 which when it is pressed inwardly engages a pin 3 mounted on a bell crank lever 4 pivoted on a stud 5. The lever 4 is also provided with a pin 6 which carries a push rod 7 which controls the mechanism shown in Fig. 8 of the patent to Wheelbarger 1,851,267. When this push bar is depressed the lever 8 is rotated counter-clockwise as viewed in Fig. 2, which completes the electric circuit as shown in the said patent so that the main drive shaft 9 is rotated one complete revolution. The shaft 9 is provided with a pinion 10 which meshes with and drives a pinion 11 mounted on a stud 12 carried by a lever 13 pivoted on the shaft 9. The pinion 11 meshes with and drives a pinion 14 mounted on a pin 15 which is also carried by the plate 13 so that all of said pinions are rotated one complete revolution each time the motor bar is depressed and under certain conditions may be caused to rotate twice for once depression of the motor bar.

A lever 16 is pivoted on a stud 17, which lever 16 is provided with an arm 18, an arm 19 and an arm 20. As shown in Fig. 1 the lever 16 is in a position such that the machine, when operated, will issue a single tag and is in the lower part of the slot 21 of the index plate 22, the upper portion of the lever 16 projecting through the said slot. In Fig. 2 the said lever 16 is shown in the upper portion of the slot 21.

The shaft 9 is provided with tangs 23 (Fig. 1) which are received within slots 24 (Fig. 5) in a hub 25 integral with a gear 26. The gear 26 is, therefore, rotated one complete revolution each time the motor bar is depressed and as will hereinafter be described, when the lever 16 is in the duplicate position, it will rotate two revolutions when the motor bar is depressed. The gear 26 meshes with and drives a gear 27 secured to a shaft 28 to which is also attached a disk 29 provided with a wrist pin 30. A pitman 31 is attached to the wrist pin 30 and also to a pin 32 which is carried by a lever 33 which is secured to an oscillating printing carrier 34 pivoted on a shaft 35. The upper end of the lever 33 is provided with a pin 36 on which is mounted a pawl 37 which carries a pin 38 to which is attached a spring 39 which tends to pull the spring upwardly against a stop 40 which is an over-turned flange of the lever 33. A pawl 37 is adapted to engage a ratchet 41 which, by means of conventional Geneva gearing not shown, rotates the unit's wheel 42 of a consecutive counter one space for each two teeth of movement of the ratchet 41. When the lever 16 is moved into the position shown in Fig. 1, a link 43 suspended from a pin 44 carried by the arm 18 is elevated, thereby rotating a lever 45 counter-clockwise as viewed in Figs. 1 and 2, the said link 43 being connected to the lever 45 by means of a pin 46. The lever 45 is provided with an arcuate shield 47 which, when the lever 16 is in the position shown in Fig. 1, holds the pawl 37 out of engagement with the ratchet 41 so that the consecutive number is not actuated when a single tag, such as shown in Fig. 9, is issued. However, when a duplicate tag, such as shown in Fig. 10, is to be issued, the lever 16 is moved into the position shown in Fig. 2 and the shield 47 is, therefore, rotated out of engagement with the pawl 37 so that when the upper half of the tag, shown in Fig. 10, is issued, the ratchet 41 is rotated $\frac{1}{10}$ of a revolution and when the second, or lower, half thereof is issued, the ratchet 41 is rotated a second $\frac{1}{10}$ of a revolution, which by means of the Geneva gearing heretofore mentioned rotates the unit's wheel 42 of the consecutive counter $\frac{1}{10}$ of a revolution so as to advance the consecutive number one unit.

The arm 19 is provided with two notches 48 and 49 which receive a nose 50 of a lever 51 pivoted on a pin 52, which lever is provided with an arm 53 which is pulled upwardly by means of a spring 54. By this means the lever 16 is held in either of its adjusted positions.

The arm 20, forming a part of the lever 16, is bifurcated at its lower extremity and receives a pin 55 mounted on a plate 56 pivoted on a shaft 57, which plate is provided with a cam slot 58. This cam slot receives a pin 59 carried by the lever 13, which lever is guided between a stud 60 and guide plate 61 carried by the motor frame 62. This cam slot is of a configuration such that when the lever 16 is in the position shown in Fig. 1 so that the parts of the machine will issue a single tag such as shown in Fig. 9, the pin 59 will be nearer the shaft 57 than it would be when the lever 16 is in a position to issue a duplicate tag or in the position shown in Fig. 2, so that when the single tag is to be issued the right hand end of the lever 13 is elevated so that the pinion 14 will be out of mesh with the gear 63 but when the lever 16 is in the position shown in Fig. 2 so as to issue a duplicate tag, the lever 13 will be lowered so as to bring the pinion 14 into mesh with the gear 63 so that the gear 63 will be driven by the pinion 14 which is driven by the motor only when the lever 16 is in position to issue the duplicate tag. At all other times the gear 63 remains stationary. It will be remembered that the pinion 10 is driven by the motor one revolution each time the motor bar is depressed. When the pinion 10 makes one revolution the pinions 11 and 14 will likewise be rotated one revolution for each have the same gear ratio. The gear 63, however, has twice as many teeth as the pinion 14 so that the shaft 64 to which the gear 63 is attached will make one revolution for each two revolutions of the shaft 9 provided the pinion 14 is in mesh with the gear 63 as will be the case when the lever 16 is in the position shown in Fig. 2 but the shaft 64 will not be rotated at all when the lever 16 is in the position shown in Fig. 1. In Figs. 1 and 2 it might appear that the pinion 10 is in mesh with the gear 63 but as shown in Fig. 4 the pinion 10 is not in the same plane with the gear 63.

Secured to the shaft 64 is a cam 65 which is normally in the position shown in Figs. 1 and 2, which cam normally engages and holds a lever 66 in the position shown in Figs. 1 and 2. This lever is loosely mounted on a shaft 67 and is provided with an arm 68 to which is attached a spring 69. The lever 66 also carries an arm 70 provided with a notch 71. The lever 13 carries a lug 72. The lever 8 is provided with an upwardly extending arm 73 which carries a pin 74 secured to a slide 75 provided with a slot 76 through which extends a guide pin 77. This slide has a forwardly extending lug 78 and an upwardly extending lug 79. When the motor bar is depressed with the parts shown as in Fig. 1, the lever 8 will be moved outwardly, thereby moving the slide 75 to the left as viewed in Fig. 1, so that the lug 78 will be immediately below the lug 72. However, the arm 70 will not be lowered because the shaft 64 will not be rotated for the pinion 14 is out of mesh with the gear 63. When the lever 16 has been moved to its duplicate position, however, as shown in Fig. 2, and when the motor bar is pressed in, the lever 8 will be moved outwardly or counterclockwise as viewed in Fig. 2 projecting the slide 75 towards the left so that the lug 78 will be immediately above the lug 72 and the lug 79 will be immediately below the notch 71 in the arm 70. The pinion 14 is now in mesh with the gear 63 so that as the motor rotates the gear 63 through the pinions 10, 11 and 14, the cam 65 will be rotated clockwise as viewed in Fig. 2. The cam 65 passes out of holding engagement with the lever 66 and the spring 69 moves the arm 70 downwardly so that the lug 79 is in the notch 71, thereby holding the slide 75 in its extreme left hand position and holding the lever 8 in the position to which it had been rotated by the depression of the push bar 1. Referring to the mechanism shown in Fig. 8 of the patent to Wheelbarger 1,851,267, the lever 108 shown in the said patent will be raised, breaking the circuit when the main drive shaft has completed one rotation but since the lever 8 shown in Fig. 2 of this application will be out of position to engage the lever 108 shown in the said patent the said lever 108 will again fall and the main drive shaft will make a second rotation. Shortly before it completes the second rotation, the cam 65 shown in Fig. 2 of this application will engage the lever 66 raising the arm 70 so as to remove the notch 71 out of engagement with the lug 79, thereby releasing the slide 75 so that the lever 8 will be in a position to engage the lever 108 shown in the patent and break the circuit to the motor. It is, therefore, apparent that when the parts are as shown in Fig. 1 a depression of the push rod 1 will cause the main drive shaft 9 to be rotated one revolution but when the parts are in the position shown in Fig. 2 the main drive shaft 9 will be rotated two revolutions. Each time the shaft 9 is rotated one revolution the printing mechanism is operated so as to print a tag.

The patent to Wheelbarger 1,858,813 shows levers which are manually set but if any one of the levers should be in between any of its given positions such as in between the numerals 1 and 2, a collar on a shaft 75 would be moved outwardly which would depress an arm 64 and rods 57, the lower end of which would be projected within a slot 72 carried by the main drive shaft, as shown in the said patent, locking the machine against operation. I employ a similar mechanism whereby if any one of the setting levers 80 should be in between its correct positions a bar 81 would be moved outwardly rotating a lever 82 on its pivot 83. The lever 82 is provided with a pin 84 on which is suspended a link 85 provided near its lower end with a slot 86 through which projects a guide pin 87. The link 85 is provided with an offset arm 88 which when the link is lowered by any one of the levers 80 being in between their given positions would be projected within a notch 89 of a disk 90 secured to a shaft 91 provided with a hub 92 which has slots 93 therein which receive tangs 94 carried by the cam 65 (Fig. 1). If, therefore, any one of the levers 80 is in an incorrect position, the shaft 91 and shaft 64 are held against rotation which will lock the motor against operation.

The function of the lugs 72 and 78 is as follows. If the motor bar is pressed with the parts shown as in Fig. 1, the lug 78 will be projected beneath the lug 72 carried by the lever 13. Suppose the operator maliciously wished to get the machine out of order by attempting to shift the lever 16 from the position shown in Fig. 1 to that shown in Fig. 2 after the motor had started to operate. The lug 72, by its engagement with the lug 78, would prevent the lever 13 being lowered and thereby prevent the pinion 14 from being brought into mesh with the gear 63. Unless this mechanism was provided the operator might lower the pinion 14 into mesh with the gear 63 after the pinion had rotated a part of its revolution and the mechanism would, therefore, be out of time. Likewise, if the lever 16 is in the position shown in Fig. 2, the lug 78 would overlie the lug 72 when the motor bar was pressed, thereby positively holding the gear 14 in mesh with the pinion 63 and preventing the operator from moving the lever 16 from the position shown in Fig. 2 to that shown in Fig. 1. If the operator tried to place the lever 16 half way in between the position shown in Fig. 1 and that shown in Fig. 2, the lug 72 would abut against the lug 78 which would lock the slide 75 against being moved and hence would lock the push bar 1 from being depressed. The lugs 72 and 78, therefore, constitute a safety device to prevent the push bar being depressed unless the lever 16 is in either its single or its duplicate position and when it is in either of these positions and the push bar is depressed, the lever 16 cannot be moved until the machine has completed the operation.

The paper feeding means 95 is fully shown and described in the patent to Wheelbarger 1,846,463 and the knife operating means 96 is shown in the patent to R. B. Long 1,841,967. I, however, do not desire for this knife to be operated when the duplicate ticket is being issued; that is, I do not wish the upper portion of the double tag to be severed from the lower portion, as shown in Fig. 10. To this end, I have provided a pin 97 (Fig. 5) on a disk 98 secured to the disk 90 which it will be remembered makes one revolution when the motor bar is depressed with the lever 16 in its duplicate position. This disk 98 is rotated in a counter-clockwise direction as viewed in Fig. 5 so that on the first part of the operation it engages a lever 99, rotating it counter-clockwise on its pivot 100 and elevating its right hand arm 101 as shown in Fig. 5, which arm engages a lever 102 pivoted on a pin 103 rotating the lever 102 counter-clockwise which, through mechanism forming no part of this invention and which is fully shown and described in the application of Thomas O'Connor and William G. Orth, Serial No. 423,701, filed January 27, 1930, renders the knife mechanism inoperative while the first tag is being issued and again renders it operative as the second tag is being issued, this being accomplished by raising the lever 104 out of engagement with a slot 105 on a knife operating shaft 106 while the first tag is being issued and dropping the lever 104 into the slot 105 while the second tag is being issued.

The totalizer 107 is fully shown and described in the patent to Wheelbarger 1,876,118, patented February 6, 1932, which totalizer is driven from a shaft 108 provided with a pinion 109 which meshes with and is driven by a pinion 110 on the shaft 91 which it will be remembered makes one revolution when, and only when, the lever 16 is in the position to issue a duplicate tag and the motor is operated so that the totalizer is actuated only once, regardless of how many single tags are issued for it is only operated when the duplicate tag is issued.

As shown in the patent to Wheelbarger 1,858,813, a Geneva pinion 111 (Fig. 5) is rotated once each time a tag is issued, which pinion is secured to a shaft 112 on which is mounted a feed roller, or platen, 113. The pinion 111 meshes with and drives a pinion 114 secured to a shaft 115 on which is mounted an electroplate 116 which is inked by means of an ink roller 117. Between the platen 113 and electroplate 116 passes a tag strip 118 which is unwound from a supply roll 119. The tag strip 118 passes over a platen 120 mounted on a shaft 121 mounted on the oscillating printing carrier 34 which also carries an ink roll 122. As this oscillating printing carrier is oscillated as heretofore described, the platen 120 will press the tag strip 118 against printing wheels 123 which print the variable data, such as the bottom row of figures and letters shown on Figs. 9 and 10. A record roll 124 carries a record strip 125 which passes over a platen 126 from which it passes to a take up roll 127 which is fed forward by the paper feeding device 95. The platen 126 is mounted on a shaft 128 which protrudes through a slot 129 in the side frames of the oscillating printing carrier. The pinion 110 meshes with and drives a pinion 130 which carries a pin 131 which engages the lower end of a lever 132 mounted on the shaft 35. The upper end of the lever 132 is provided with a cam surface 133 which engages the shaft 128 and normally the shaft 128 rests in the lower end of the slot and the lever 132 performs no function. When the oscillating printing carrier 34 is oscillated with the shaft in its depressed condition, the platen 126 will not engage the printing wheels 123 and no impression will be made on the record which is to be retained within the machine in the form of a roll. When the duplicate tag, however, is issued the pinion 110 will be rotated and the pin 131 will engage the lever 132 rocking it anti-clockwise so that the cam surface 133 will engage the shaft 128 and raise it to the upper end of the slot so that the platen 126 will press the record strip 125 against the printing wheels, thereby impressing on the record strip the variable data such as is printed on the last lines of Figs. 9 and 10.

It will, therefore, be seen that the inventor has provided a mechanism whereby the fixed data such as printed on the upper part of the tag shown in Fig. 9 will be printed by the electroplate. A tag will be issued each time the motor bar is depressed and when the lever 16 is placed in its duplicate position a duplicate tag will be issued. As many single tags can be issued as desired but only one duplicate tag. When the duplicate tag is issued the totalizer is actuated and the knife mechanism is rendered inoperative until the lower portion of the duplicate tag is being issued. The consecutive number is the same on all of the single tags and on the duplicate tag and it is not advanced to the next serial number until the last portion of the duplicate tag is being issued. If the operator wishes to mark a three-piece suit, he will set the variable printing wheels so as to print all of the data shown on the lower line of Fig. 9 with the exception of the serial number which he cannot change. He then places the lever 16 in its single position and presses the motor bar twice so as to issue two single tags which are exact duplicates of each other. He then places the lever 16 in its duplicate position and he issues a duplicate tag such as shown in Fig. 10. The single tags he places on two of the articles composing the suit and the duplicate tag he places on the third article comprising the suit. If these various garments should become separated from each other the clerk will have no trouble in re-matching the pieces by comparing the tags. When the article is sold the clerk cuts off the lower portion of the tag shown in Fig. 10 and sends it to the accounting department, from which a daily inventory of goods sold is made and by which the management can keep track of the stock on hand. From this invention the management can readily ascertain what sizes and styles, etc., will move readily and what is a slow moving stock. They can also ascertain what merchandise is becoming low, what merchandise is being depleted, and from this information they will be able to judge what they should order in the future. This information is readily ascertainable by taking the record strip from the machine showing all goods which have been marked up and, therefore, all goods which have been purchased. As each article is sold this article is marked off of the said record strip. That which remains on the record strip is the stock still on hand and, therefore, a complete record is always maintained as to stock on hand, as well as a detailed audit of the stock which has been sold.

I realize that many changes may be made in the specific form of the structure which I have shown herein by way of illustration and I, therefore, reserve the right to make all changes which may fall within the terms of the following claims.

Having now described my invention, I claim:

1. In a machine, a member capable of being set to a plurality of positions, means whereby when it is set to one position a single tag will be issued and when set to another position a double tag will be issued and means whereby when the member is first set to issue a single tag and is thereafter set to issue a double tag the same serial number will be printed on said single tag and said double tag.

2. In a machine, a settable member, a plate controlled thereby, means to restrain the resetting of said member and plate when the machine is being operated, means controlled by the said member and plate whereby when said member is set to one position a single tag will be issued and when set to another position a double tag will be issued, a consecutive numbering device, and means whereby said device is rendered inoperative when the member is set to issue a single tag.

3. In a machine, a member capable of being set to a plurality of positions, means whereby when it is set to one position a single tag will be printed and issued and when set to another position a double tag will be printed and issued, a consecutive numbering device, and means whereby said device is rendered inoperative when the member is set to issue a single tag.

4. In a machine, a settable member, a plate controlled thereby, means to restrain the resetting of said member and plate when the machine is being operated, means controlled by the said member and plate whereby when said member is set to one position a single tag will be printed and issued and when set to another position a double tag will be printed and issued, and means whereby when the member is first set to issue a single tag and is thereafter set to issue a double tag the same serial number will be printed on said single tag and said double tag.

5. In a machine, a settable member, a motor control bar, means whereby when said settable member is in one position and said bar is operated one tag will be printed and when said member is in another position and said bar is operated a double tag will be printed, a consecutive numbering device, and means whereby said device is rendered inoperative when the member is set to issue a single tag.

6. In a machine, a settable member, a motor control bar, means whereby when said settable member is in one position and said bar is operated one tag will be printed and when said member is in another position and said bar is operated a double tag will be printed, means whereby either the single or double tag is issued each time said bar is operated, and means whereby when the member is first set to issue a single tag and is thereafter set to issue a double tag the same serial number will be printed on said single tag and said double tag.

7. In a machine, a settable member, a plate controlled thereby, means to restrain the resetting of said member and plate when the machine is being operated, means controlled by the said member and plate whereby when said member is set to one position a single tag will be printed and issued and when set to another position a double tag will be printed and issued, and means whereby the same consecutive number will be printed on all the single tags and on both of the tags forming the double tag.

8. In a machine, a settable member, an operating means, means whereby when said settable member is in one position and said operating means is operated one tag will be printed and issued and when said member is in another position and said operating means is operated a double tag will be printed, a consecutive numbering device, and means whereby the consecutive numbering device is held inoperative while one or more single tags are printed and issued.

9. In a machine, a settable member, an operating means, means whereby when said settable member is in one position and said operating means is operated one tag will be printed and issued and when said member is in another position and said operating means is operated a double tag will be printed, a consecutive numbering device, and means whereby the consecutive numbering device is held inoperative while one or more single tags are printed and issued and is rendered operative when and only when the last part of the double tag is being issued.

PERCY G. STIMSON.